(12) United States Patent
Hong et al.

(10) Patent No.: US 10,680,298 B2
(45) Date of Patent: Jun. 9, 2020

(54) BATTERY SYSTEM FOR VEHICLE

(71) Applicant: LG CHEM, LTD., Seoul (KR)

(72) Inventors: Sung Gi Hong, Daejeon (KR); Kwang Min Kim, Daejeon (KR); Jae Kwon Lim, Daejeon (KR); Ho Yul Jeong, Daejeon (KR); Nam Hyun Park, Daejeon (KR); Geun Jeong Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 65 days.

(21) Appl. No.: 15/744,684

(22) PCT Filed: Feb. 13, 2017

(86) PCT No.: PCT/KR2017/001549
§ 371 (c)(1),
(2) Date: Jan. 12, 2018

(87) PCT Pub. No.: WO2017/150818
PCT Pub. Date: Sep. 8, 2017

(65) Prior Publication Data
US 2018/0212287 A1    Jul. 26, 2018

(30) Foreign Application Priority Data

Mar. 3, 2016    (KR) .......................... 10-2016-0025586

(51) Int. Cl.
*H01M 10/625*    (2014.01)
*H01M 10/6568*   (2014.01)
(Continued)

(52) U.S. Cl.
CPC ............. *H01M 10/625* (2015.04); *B60L 3/00* (2013.01); *B60L 50/50* (2019.02); *B60L 58/26* (2019.02);
(Continued)

(58) Field of Classification Search
CPC .......... H01M 10/625; H01M 10/6568; H01M 10/635; H01M 10/613
See application file for complete search history.

(56) References Cited

U.S. PATENT DOCUMENTS

2006/0169507 A1    8/2006    Inoue et al.
2010/0047681 A1    2/2010    Mitsui
(Continued)

FOREIGN PATENT DOCUMENTS

EP    2 804 188 A1    11/2014
EP    2 851 973 A1    3/2015
(Continued)

OTHER PUBLICATIONS

European Search Report for Appl. No. 17760222.4 dated May 11, 2018.
(Continued)

*Primary Examiner* — Osei K Amponsah
(74) *Attorney, Agent, or Firm* — Birch, Stewart, Kolasch & Birch, LLP

(57) ABSTRACT

The present invention relates to a battery system for a vehicle, which comprises: a battery pack installed in a trunk room of the vehicle and provided with a plurality of battery cells and an electrolyte; a cooling device circulating cooling water to cool an engine installed in the vehicle; and a safety device that injects the cooling water of the cooling device (Continued)

into the battery pack to cool the battery pack through impregnation of the cooling water to the plurality of battery cells when a temperature of the battery pack increases to a preset temperature or more.

4 Claims, 3 Drawing Sheets

(51) Int. Cl.
| | | |
|---|---|---|
| *H01M 10/635* | (2014.01) | |
| *H01M 10/613* | (2014.01) | |
| *H01M 10/663* | (2014.01) | |
| *B62D 25/08* | (2006.01) | |
| *B60L 58/26* | (2019.01) | |
| *B60L 50/50* | (2019.01) | |
| *B60L 3/00* | (2019.01) | |
| *H01M 10/63* | (2014.01) | |

(52) U.S. Cl.
CPC .......... *B62D 25/08* (2013.01); *H01M 10/613* (2015.04); *H01M 10/63* (2015.04); *H01M 10/635* (2015.04); *H01M 10/6568* (2015.04); *H01M 10/663* (2015.04); *H01M 2220/20* (2013.01)

(56) References Cited

U.S. PATENT DOCUMENTS

| | | | |
|---|---|---|---|
| 2012/0263988 A1* | 10/2012 | Obasih | H01M 10/625 429/98 |
| 2013/0017421 A1* | 1/2013 | Onnerud | B60R 21/01 429/61 |
| 2014/0342201 A1 | 11/2014 | Andres | |

FOREIGN PATENT DOCUMENTS

| | | |
|---|---|---|
| JP | S59-79964 A | 5/1984 |
| JP | 6-24238 A | 2/1994 |
| JP | 9-130917 A | 5/1997 |
| JP | 2006-216303 A | 8/2006 |
| JP | 2008-166169 A | 7/2008 |
| JP | 2008-290636 A | 12/2008 |
| JP | 2010-277737 A | 12/2010 |
| JP | 2011-173543 A | 9/2011 |
| JP | 2013-237355 A | 11/2013 |
| KR | 10-2012-0069334 A | 6/2011 |
| KR | 10-2015-0062783 A | 6/2015 |

OTHER PUBLICATIONS

International Search Report for PCT/KR2017/001549 (PCT/ISA/210) dated Apr. 28, 2017.

* cited by examiner

BATTERY SYSTEM FOR VEHICLE

CROSS-REFERENCE TO RELATED APPLICATION

The present application claims the benefit of the priority of Korean Patent Application No. 10-2016-0025586, filed on Mar. 3, 2016, which is hereby incorporated by reference in its entirety.

TECHNICAL FIELD

The present invention relates to a battery system for a vehicle, and more particularly, to a battery system for a vehicle, which prevents a battery pack from being ignited through cooling water for cooling an engine of the vehicle to improve safety.

BACKGROUND ART

In general, secondary batteries refer to chargeable and dischargeable, unlike primary batteries that are not chargeable. The secondary batteries are being widely used for mobile phones, notebook computers, and camcorders, electric vehicles, and the like. Among them, a secondary battery used in an electric vehicle uses a battery pack in which two or more battery cells are connected in parallel or in series.

DISCLOSURE OF THE INVENTION

Technical Problem

The battery pack for the vehicle according to the related art may cause fire and explosion when burn-out of the battery pack occurs by a fatal external impact such as collision of a vehicle. Also, when the short circuit occurs due to circuit problems in the battery pack, the fire and explosion may occur.

The present invention has been made to solve the above problems, and thus an object of the present invention is to provide a battery system for a vehicle, which prevents the battery pack from being exploded by injecting cooling water for cooling an engine of the vehicle into the battery pack to suppress an occurrence of the explosion of the battery pack when problems of the battery pack occur due an external impact or short circuit.

Technical Solution

To achieve the abovementioned object, a battery system for a vehicle according to the present invention comprises: a battery pack installed in a trunk room of the vehicle and provided with a plurality of battery cells and an electrolyte; a cooling device circulating cooling water to cool an engine installed in the vehicle; and a safety device that injects the cooling water of the cooling device into the battery pack to cool the battery pack through impregnation of the cooling water to the plurality of battery cells when a temperature of the battery pack increases to a preset temperature or more.

The safety device may comprise: an injection tube through which the cooling water of the cooling device is injected into the battery pack; a switching valve that switches an opening and closing of the injection tube; a temperature sensor detecting a temperature of the battery pack; and a controller that opens the switching valve to inject the cooling water of the cooling device into the battery pack when the temperature of the battery pack, which is detected by the temperature sensor, is above the preset temperature.

A material that is dissolved into the cooling water injected into the battery pack and increases electrical conductivity may be provided in the battery pack.

The material that increases the electrical conductivity may comprise salt.

The material that increases the electrical conductivity may be provided in the battery pack, in which the injection tube is disposed, in a state of being built in felt having fine holes.

The battery pack may comprise a check valve that discharges air within the battery pack to the outside.

Advantageous Effects

According to the present invention, since the battery pack is cooled by using the cooking water for cooling the engine provided in the vehicle, the battery pack may be prevented from being exploded by the external or internal factors. Particularly, the cooling water of the vehicle may be used to significantly reduce the manufacturing costs.

Also, according to the present invention, the material that is capable of increasing the electrical conductivity may be provided in the battery pack to quickly discharge the battery pack by the material, which is capable of increasing the electrical conductivity, together with the cooling water, thereby previously preventing the accidents that may occur later due to the battery pack from being occurring.

NODE FOR CARRYING OUT THE INVENTION

Figure 1:
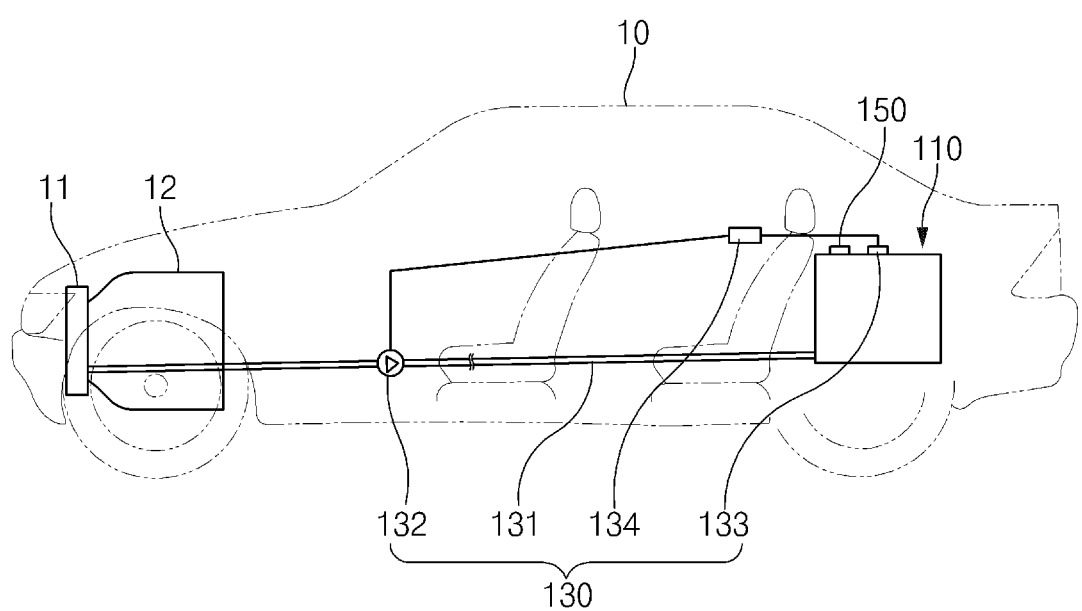
FIG. 1 is a view of a battery system for a vehicle according to the present invention.
Figure 2:
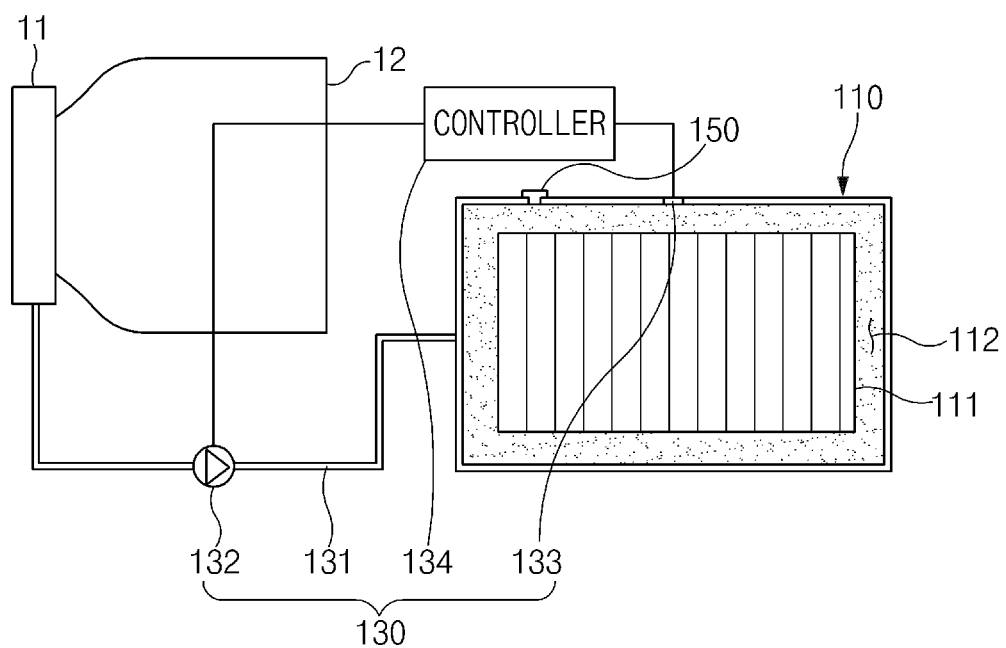
FIG. 2 is an enlarged view of the battery system for the vehicle according to the present invention.
Figure 3:
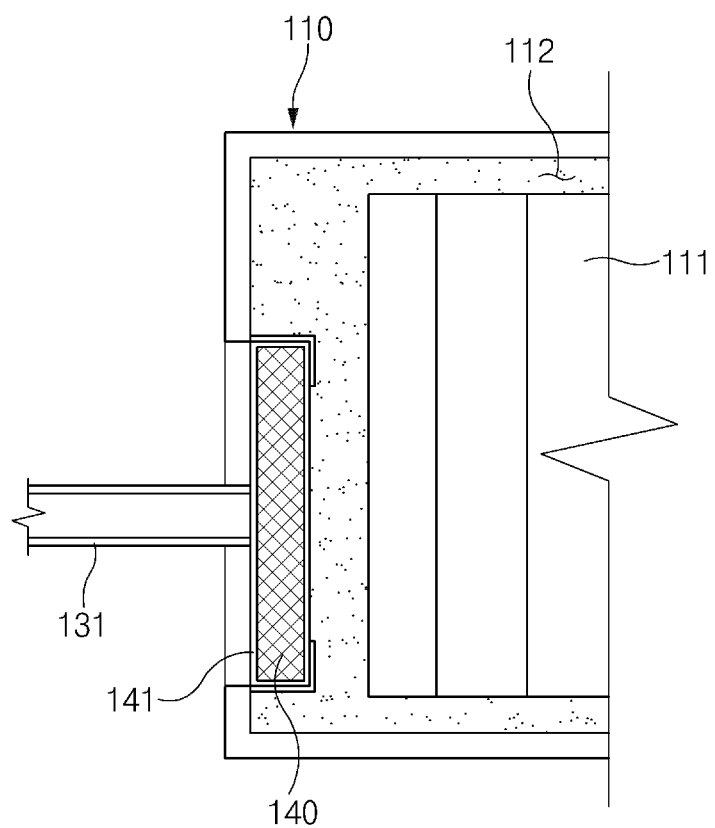
FIG. 3 is a view of the battery system for the vehicle, which comprises a material that increases electrical conductivity according to the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

As illustrated in FIG. 1, a battery system for a vehicle according to the present invention comprises a battery pack 110 installed in a trunk room 11 of a vehicle 10 and provided with a plurality of battery cells 111 and an electrolyte 112, a cooling device 120 circulating cooling water to cool an engine 12 installed in the vehicle 10, and a safety device 130 that injects the cooling water of the cooling device 120 into the battery pack 110 to cool the battery pack 110 through impregnation of the cooling water to the plurality of battery cells 111 when a temperature of the battery pack 110 increases to a preset temperature or more.

The battery system for the vehicle according to the present invention may drive the engine 12 or electronic devices such as lighting devices of the vehicle by using electric energy generated in the battery pack 110. Here, when the engine 12 is driven, high-temperature heat may be generated. The high-temperature heat of the engine 12 may be cooled while the cooling water of the cooing device 120 circulates around the engine 12.

Here, when a collision accident of the vehicle 10 occurs, the vehicle 10 may be buckled to cause deformation of the battery pack 110. Here, a circuit connected to the plurality of battery cells 111 provided in the battery pack 110 may be short-circuited or ignited due to the short circuit to cause explosion of the vehicle 10.

To solve the above problems, the battery system for the vehicle according to the present invention may comprises the safety device 130 that injects the cooling water of the cooling device 120 into the battery pack 110 to suppress the short circuit and ignition of the battery pack 110 when a temperature of the battery pack 110 increases to the preset temperature or more. The safety device 130 may previously prevent the vehicle 10 from being exploded.

That is, the safety device 130 provided in the battery system for the vehicle according to the present invention comprises an injection tube 131 connecting the cooling device 120 to the battery pack 110 to inject the cooling water of the cooling device 120 into the battery pack 110, a switching valve 132 that switches an opening and closing of the injection tube 131, a temperature sensor 133 detecting a temperature of the battery pack 110, and a controller 134 that opens the switching valve 132 to inject the cooling water of the cooling device 120 into the battery pack 110 when the temperature of the battery pack 110, which is detected by the temperature sensor 133, is above the preset temperature. Here, the preset temperature may range from 50° C. to 100° C.

The safety device 130 comprises a check valve 150 that discharges air within the battery pack 110 to the outside and also blocks introduction of external air into the battery pack 110.

That is, when the cooling water is injected into the battery pack 110, the air within the battery pack 110 may be discharged to the outside through the check valve 150. Thus, the cooling water may be more quickly injected into the battery pack 110.

As described above, in the safety device 130 provided in the battery system for the vehicle according to the present invention, when the battery pack 110 increases in temperature by collision of the vehicle, the temperature sensor 133 detects the increasing temperature of the battery pack 110 to transmit the temperature value to the controller 134, and then, the controller 134 compares the temperature of the battery pack 110, which is detected by the temperature sensor 133, with the preset temperature. Here, when the temperature of the battery pack 110 is above the preset temperature, the controller 134 determines that a problem occurs in the battery pack 110 to open the switching valve 132. As a result, the cooling water of the cooling device 120 is injected into the battery pack 110 through the injection tube 131, and the cooling water injected into the battery pack 110 is mixed with the electrolyte 112 and simultaneously impregnated into the plurality of battery cells 111 to suppress the short circuit and the ignition. Particularly, the circuit within the battery pack 110 is sunk into the cooling water to prevent the circuit from being ignited due to the short circuit.

That is, while the cooling water is injected into the battery pack 110, the temperature of the battery pack 110 is cooled to a temperature less than the preset temperature to prevent the battery pack and the vehicle from being exploded.

Here, the air within the battery pack 110 may be discharged to the check valve 150, and thus, the cooling water may be more quickly injected.

When the vehicle in which the collision accident occurs is left for a long time, the cooling water injected into the battery pack 110 may be discharged to the outside of the battery pack 110 and thus removed. Here, when the cooling water injected into the battery pack 110 is removed, the short circuit may occur again due to energy remaining in the battery cells of the battery pack 110.

To prevent this phenomenon, the battery system for the vehicle according to the present invention may quickly consume the energy remaining the battery cells while cooling the battery cells to previously prevent an accident that may occur later from occurring.

That is, in the battery system for vehicle according to the present invention, a material 140, which increases electrical conductivity for maximizing properties of the electrolyte 112 while being dissolved into the cooling water injected into the battery pack 110, is provided in the battery pack 110. The material that is capable of increasing the electrical conductivity may be provided in the battery pack 110 in which the injection tube 131 is disposed and gradually dissolved into the cooling water injected into the battery pack 110 through the injection tube 131. Then, the material together with the cooling water may be mixed with the electrolyte to maximize the properties of the electrolyte 112 and thereby to quickly consume the energy of the battery cells 111, thereby discharging the battery cells 111. Here, the material 140 that increases the electrical conductivity may be salt.

The material 140 that increases the electrical conductivity may be provided in the battery pack 110 in a state in which the material 140 is built in felt 141 having fine holes. Thus, a storage property of the material 140 that increases the electrical conductivity may be improved.

Also, the check valve 150 that discharges a gas generated in the battery pack 110 to the outside may be provided in the battery pack 110. The check valve 150 may discharge the gas generated in the battery pack 110 to the outside to previously prevent the battery pack 110 from being exploded, and particularly, to prevent the inside of the battery pack 110 from being contaminated due to the introduction of external air and foreign substances.

Thus, in the battery system for the vehicle according to the present invention, the cooling water of the cooling device 120 that cools the engine 12 of the vehicle may be directly supplied into the battery pack 110 to cool the battery pack 110, thereby previously preventing the accident due to the battery pack 110 from occurring.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A battery system for a vehicle, comprising:
   a battery pack installed in a trunk room of the vehicle and provided with a plurality of battery cells and an electrolyte;
   a cooling device configured to circulate cooling water to cool an engine installed in the vehicle;
   a safety device having an injection tube configured to inject the cooling water of the cooling device into the battery pack to cool the battery pack through impregnation of the cooling water to the plurality of battery cells when a temperature of the battery pack increases to a preset temperature or more;

a felt having fine holes located in the battery pack near the injection tube; and a material comprising salt being provided in the felt, the material being dissolvable into the cooling water injected into the battery pack to increase electrical conductivity.

2. A battery system for a vehicle, comprising:

a battery pack installed in a trunk room of the vehicle and provided with a plurality of battery cells and an electrolyte;

a cooling device circulating cooling water to cool an engine installed in the vehicle;

a safety device that injects the cooling water of the cooling device into the battery pack to cool the battery pack through impregnation of the cooling water to the plurality of battery cells when a temperature of the battery pack increases to a preset temperature or more, the safety device including:

an injection tube through which the cooling water of the cooling device is injected into the battery pack;

a switching valve that switches an opening and closing of the injection tube;

a temperature sensor detecting a temperature of the battery pack; and a controller that opens the switching valve to inject the cooling water of the cooling device into the battery pack when the temperature of the battery pack, which is detected by the temperature sensor, is above the preset temperature, a felt having fine holes located in the battery pack near the injection tube; and a material comprising salt being provided in the felt, the material being dissolvable into the cooling water injected into the battery pack to increase electrical conductivity.

3. The battery system of claim 1, wherein the battery pack comprises a check valve that discharges air within the battery pack to the outside.

4. The battery system of claim 2, wherein the battery pack comprises a check valve that discharges air within the battery pack to the outside.

* * * * *